United States Patent [19]

Saxe

[11] 4,247,175

[45] *Jan. 27, 1981

[54] LIGHT VALVE CONTAINING IMPROVED LIGHT VALVE SUSPENSION

[75] Inventor: Robert L. Saxe, New York, N.Y.

[73] Assignee: Research Frontiers Incorporated, Plainview, N.Y.

[*] Notice: The portion of the term of this patent subsequent to May 24, 1994, has been disclaimed.

[21] Appl. No.: 956,417

[22] Filed: Oct. 31, 1978

Related U.S. Application Data

[63] Continuation-in-part of Ser. No. 612,085, Sep. 10, 1975, abandoned, which is a continuation-in-part of Ser. No. 478,634, Jun. 12, 1974, abandoned, which is a continuation-in-part of Ser. No. 267,770, Jul. 31, 1972, abandoned.

[51] Int. Cl.$^3$ .................................................. G02F 1/01
[52] U.S. Cl. .................................. 350/362; 252/300; 252/308; 252/309; 350/356; 350/397
[58] Field of Search ............... 252/300, 301, 308, 309; 350/150, 1, 362, 154, 356; 210/36, 37, 40

[56] References Cited

U.S. PATENT DOCUMENTS

| | | | |
|---|---|---|---|
| 1,951,664 | 3/1934 | Land | 350/154 |
| 1,955,923 | 4/1934 | Land | 350/150 |
| 2,176,516 | 10/1939 | Wilmanns et al. | 350/154 |
| 2,178,996 | 11/1939 | Land et al. | 350/154 |
| 2,289,712 | 7/1942 | Land et al. | 350/154 |
| 3,512,876 | 5/1970 | Marks | 350/362 |
| 3,773,684 | 11/1973 | Marks | 350/267 |
| 4,025,163 | 5/1977 | Saxe et al. | 350/362 |

OTHER PUBLICATIONS

Hatschek, E., "An Herapathite Suspension," *Kolloid-Zeitschrift*, vol. 45, pp. 195–197 (1928).

*Primary Examiner*—Deborah L. Kyle
*Attorney, Agent, or Firm*—Jacobs & Jacobs

[57] ABSTRACT

In a light valve comprising a liquid suspension of small particles selected from the group consisting of halogenated alkaloid acid salts and metal halides in a liquid suspending medium, the improvement in which said liquid suspending medium comprises a liquid, saturated, aliphatic halogenated hydrocarbon having a ratio of halogen atoms to all other atoms therein of greater than 1:1, the halogen atoms of said particles being iodine and/or bromine and the halogen atoms of said halogenated hydrocarbon being of lower atomic weight than the halogen atoms of said particles, and at least 50% the halogen atoms of said halogenated hydrocarbon being selected from the group consisting of fluorine and chlorine.

13 Claims, No Drawings

LIGHT VALVE CONTAINING IMPROVED LIGHT VALVE SUSPENSION

The present application is a continuation-in-part of my pending application Ser. No. 612,085, filed Sept. 10, 1975, abandoned which in turn is a continuation-in-part of my then copending application, Ser. No. 478,634, filed June 12, 1974, now abandoned, which in turn is a continuation-in-part of my then copending application Ser. No. 267,770 filed July 31, 1972, now abandoned.

The present invention relates to light valves and more particularly to improvements in the liquid suspension of particles contained within the light valve cell.

Light valves have been used for over forty years for modulation of light. In Dr. Edwin Land's U.S. Pat. No. 1,955,923 the light valve was defined as a cell formed of two transparent sheets of insulating material spaced apart a small distance and containing a suspension of small particles in a liquid suspending mechanism. As a practical matter, the suspension also includes a polymeric stabilizer dissolved in the liquid suspending medium, such as nitrocellulose, to prevent agglomeration of the particles. U.S. application Ser. No. 932,512, filed Aug. 10, 1978, discloses other polymeric stabilizers, such as copolymers of 3,5,5 trimethylhexyl ylate/bis-2-ethylhexyl fumarate2-hydroxypropyl acrylate/fumaric acid, and bis-2-ethylhexyl fumarate /3,5,5-trimethylhexyl acrylate/vinylidene chloride/mesaconic acid.

In the absence of an applied electrical field, the particles in the suspension exhibit random Brownian movement, and hence a beam of light passing through the cell is reflected or absorbed, depending upon the nature of the particles. When an electrical field is applied through the suspension in the light valve, the particles become aligned and for many suspensions most of the light can pass through the cell.

Light valves have been extensively described in the literature. See U.S. Pat. Nos. 1,955,923, 1,963,496, 3,512,876 and 3,773,684. In the early days of television, Donal, Langmuir and Goldmark thoroughly investigated the use of light valves in black and white as well as color television. See U.S. Pat. Nos. 2,290,582, 2,481,621, 2,528,510 and 2,645,976. A more modern use of the light valve is as an alpha-numeric display.

As is known, the light valve liquid suspending medium may be virtually any liquid so long as it suspends the small particles and dissolves the polymeric stabilizer. Esters, nitrobenzene, oils and halogenated hydrocarbons have been recommended for use as the liquid suspending medium. See U.S. Pat. Nos. 1,951,664, 2,290,582 and others. Preferably, the liquid suspending medium has a relatively high electrical resistivity and low vapor pressure, and does not degrade or attack the particles or other components of the suspension.

Organic esters useful as all or part of the liquid suspending medium include isopentyl acetate, dioctyl phthalate, diisodecyl adipate, para-nonylphenyl acetate and dioctyl sebacate. Non-solvents for the stabilizing polymer may also be used as part of the suspending medium if they do not cause the polymer to precipitate; it is important that the stabilizing polymer be well dissolved when the suspension is used in a light valve.

The shape of the particles used in a light valve suspension should be such that in one orientation they intercept more light than in another orientation. Particles which are needle-shaped, rod-shaped, lath-shaped, or in the form of thin flakes, have been suggested. The particles may variously be light-absorbing or light-reflecting, polarizing, birefringent, metallic or non-metallic. Preferably, the particles are light-polarizing crystals, because a relatively small concentration of them in suspension can provide a relatively large change in optical density between the activated and unactivated states of the light valve. The prior art has suggested a wide variety of particles for use in light valves, such as mica, aluminum, graphite, metal halides and perhalides of alkaloid acid salts.

The present invention is concerned with the use of metal halides and perhalides of alkaloid acid salts as the particles in the light valve suspension, preferably those that are light-polarizing. (The term "alkaloid" is used herein to mean an organic nitrogenous base, as defined in Hackh's Chemical Dictionary, Fourth Edition, McGraw-Hill Book Company, New York, 1969).

The prior art teaches that halogenated alkaloid acid salts are useful in light valve suspensions. See, for example, U.S. Pat. No. 2,176,516, which refers to light polarizing halides of acid salts of heterocyclic organic nitrogen bases. Preferably, the alkaloid moiety is a quinine alkaloid, as defined in Hackh's Chemical Dictionary, supra. U.S. Pat. Nos. 2,178,996 and 2,289,712 refer in detail to the use of halides of quinine alkaloid acid salts in light valves and these are useful in the present invention.

Examples of useful halides of alkaloid acid salts include halides of acid salts of heterocyclic organic nitrogenous bases such as pyridine, picoline, diphenyl oxazole, quinoline and quinaldine; of quinine, cinchonidine, hydrocinchonodine, hydrocinchonine and of other quinine alkaloids; and of toluidine and the like.

Preferred metal halides are the transition metal halides, such as cupric bromide.

In the formation of halogenated alkaloid acid salts for use in a light valve suspension, an excess amount of halogen is very often used to insure that all or almost all of the particles have the desired amount of the halogen in their molecular structure and thereby have suitable properties. However, the excess or residual halogen tends to go into solution in the liquid suspending medium and imparts color, to the suspending medium, an especially undesirable result since the desire is to have the suspending medium either clear or tinted in a predetermined color. A typical situation is the one with iodine as the halogen where the iodine will tint the suspension an undesirable color, usually yellow. Thus, it would be highly desirable if this residual dissolved halogen could be removed from solution.

In addition, where the light valve suspension contains light-polarizing halogenated particles, the particles are very often formed with a thin coating of halogen on their surface. This coating is very advantageous in that it improves the functioning of the particles in the light valve, and improves their thermal stability. However, the coating very often does not remain on the particles after their formation. Some of it quickly goes into solution in the liquid suspending medium in the same manner as with the residual dissolved halogen previously mentioned. It would, therefore, be desirable to return the halogen to the surface of the particles in the light valve suspension. Furthermore, if the particles are formed with insufficient halogen coating, it is desirable to add an amount of halogen to the surface of the particles.

This invention provides an improved light valve comprising a liquid suspension of small particles of a halogenated alkaloid acid salt or of a metal halide, wherein the liquid suspending medium comprises a liquid, saturated, aliphatic halogenated hydrocarbon having a ratio of halogen atoms to all other atoms therein of greater than 1:1, the halogen atoms of said halogenated alkaloid acid salt and of said metal halide being iodine and/or bromine and the halogen atoms of said halogenated hydrocarbon being of lower atomic weight than the halogen atoms of said particles, and at least 50% the halogen atoms of said halogenated hydrocarbon being selected from the group consisting of fluorine and chlorine.

The present invention is based on the use of the halogenated aliphatic hydrocarbon in the light valve suspension. It is believed that the halogenated aliphatic hydrocarbon causes any halogen in solution originating from the particles in the suspension to be rendered harmless. In any case, the use of the halogenated aliphatic hydrocarbon can significantly improve the optical characteristics of the light valve suspension.

Halogen compounds have been mentioned in the prior art as being used in fluid suspensions containing polarizing, halogen-containing particles. However, the halogen compounds were ones where the amount of halogen atoms in the molecule in proportion to the total number of atoms was insufficient to yield the desired result, preferably at least two halogen atoms to one of the non-halogen atoms of the molecule. These prior art compounds were not used for and they would not work for the present purpose. Also, if a compound is deleterious to the suspension and especially to the particles, the compound obviously is not useful for the purposes of the invention herein described. Finally, certain volatile compounds containing halogen were used in the formation of light-polarizing particles, but were not used in the suspension for the particles—they were only used in forming the particles themselves. In any case, the compounds were so volatile that they were completely evaporated before the particles were placed in final suspension. They, therefore, could not be used for the purposes of this invention.

An example of the present invention is the addition of chloroform to a light valve suspension of herapathite particles in a liquid suspending medium. The herapathite particles are formed by combining quinine bisulfate, iodine and hydriodic acid. The formula for herapathite is $4(C_{20}H_{24}N_2O_2)\cdot 3H_2SO_4 2HI.I_46H_2O$. Therefore, iodine is a significant ingredient in the structure of herapathite crystals. To ensure that enough iodine is present to properly form the particles, a stoichiometric excess is added. The excess iodine is allowed to remain with the mass of herapathite particles, because any process to remove the iodine might remove some of it from the particles and impair their operability. Therefore, when the mass of particles is added to liquid suspending medium for herapathite, such as isopentyl acetate or diisooctylphthalate, the excess iodine goes into solution and imparts color to the suspension. However, by adding chloroform to the suspension, the characteristic iodine color disappears from the suspension.

The result of this act can be readily seen. For instance, a herapathite-isopentyl acetate suspension is often a purplish color in appearance. This color is partially due to the excess iodine in solution. However, as soon as chloroform is added to the suspension, the suspension turns a blue or bluish color in appearance.

The importance of this phenomenon is as follows. Herapathite particles are light-polarizing and can be oriented by the application of an electric field across the suspension by the application of the voltage between the conductive coatings on opposed faces of the light valve cell walls. Normally, the suspension appears darkly colored, such as a blue or purplish color for herapathite. However, when a field is applied across the suspension the suspended particles become aligned. The particles are preferably needle-shaped or rod-shaped and have a length to diameter ratio of between 5 to 1 and 20 to 1. When they are aligned, the long dimension of the particle usually orients itself so that it is parallel to the applied field. The particles are then perpendicular to the transparent wall sections of the cell. In this position, because the particles are so aligned that the person viewing the suspension will be looking at them parallel to their long dimension, the entire suspension will appear transparent and light will readily pass therethrough. It is in this position that it is especially important that the suspension be transparent. If the present invention is not used, the iodine will tint the suspension a color in this aligned ("on") position when the desire is to have a non-colored, clear and transparent suspension. This tint for example, can be a yellow tint which will substantially detract from the light transmission capabilities of the suspension and therefore of the entire light valve. Thus, it is especially important for the suspension to be clear in the actuated condition. Also, if it contains excess halogen above a negligible amount, the halogen might also turn the suspension from a blue to a purple color in the "off" or non-aligned position; and to some other color if particles other than herapathite are used. This is also unsatisfactory. Thus, in the "on" condition, it will not be the desired color. However, as described above, the addition of chloroform or other halogenated aliphatic hydrocarbon to the herapathite suspension removes the undesired color.

When herapathite particles are used in a light valve, the presence of halogen, especially iodine, in and/or on the particles increases their light-polarizing properties. The suspension then appears darker in the "off" position, but the "on" condition is not affected. This is very desirable, since the ratio of optical densities in the dark and light conditions, which is sometimes referred to as the optical density ratio, will thus be increased; i.e., the difference between the optical densities in the open and closed conditions will be increased. The use of the halogenated aliphatic hydrocarbon appears to drive the halogen out of the suspending medium and onto the surfaces of the suspended particles, presumably because the halogen is adsorbed or absorbed by the particles, or coats the particles, or combines chemically with the particles. The beneficial results of this are: the original halogen no longer colors the solution because the halogen is removed from solution; the suspended particles become more effective polarizers, thereby increasing the optical density of the suspension when used in a light valve in the closed state; and the original halogen, now added to the particles, does not contribute as much to undesirable electrical conductivity of the suspension, which would increase voltage and power requirements and thereby promote agglomeration.

The following experiment and observation tend to support the aforesaid theory that the original halogen is driven to the suspended particles.

When chloroform is added to a solution of iodine in isopentyl acetate without the presence of any herapathite or other type of suspended particles, the color of the solution does not significantly change (except for a slight lightening of color due to dilution). This demonstrates that chloroform does not cause the iodine to disappear by means of any chemical combination with the chloroform or the isopentyl acetate. However, if herapathite or similar crystals are present in the isopentyl acetate, the iodine color disappears when chloroform is added.

As a further discussion of a possible theory, it may be noted that the iodine will not displace the chlorine in the chloroform because the iodine ion is a weaker base than the chlorine ion. A base formed by an ion of one halogen is stronger than the base formed by the ion of a halogen of higher atomic number. Thus, the halogen of lower atomic number in the halogenated hydrocarbon will displace the halogen of higher atomic number in the particle, but not vice versa.

Continuing the discussion of the aforesaid theory, when a suspension contacts the atmosphere, the iodine escapes from the suspension through the air-liquid interface. When a light valve is sealed there is less change of this happening, but the possibility still exists. When it does happen, the suspension generally changes in color. If it is a herapathite suspension, it goes from a blue through a purple to a red-purple and finally to a red color. This indicates (according to the theory under discussion) that the iodine is coming off the surfaces of the particles, going into the solution in the suspending medium, and escaping to the atmosphere. The present invention, will cause the iodine to go back from solution onto the surfaces of the particles to produce the superior polarizing effects previously described. Merely adding excess iodine to a solution from which the iodine has escaped into the atmosphere, or from which the iodine coating the particles has gone into solution, will not solve the problem because the added excess iodine will also go into solution in the suspending medium and will not coat the surfaces of the particles as desired. The present invention overcomes this problem.

It will be appreciated that for the compound that is added to function properly, it must be soluble in the liquid suspending medium and it should be a relatively poor solvent for the dissolved halogen. The halogenated aliphatic hydrocarbons described above fulfill these requirements.

The halogenated aliphatic hydrocarbon must be used in a manner such that it will not affect any of the desired ingredients of the light valve liquid suspension. The amount of halogenated aliphatic hydrocarbon added will depend on a number of factors: the type of suspended particles; the amount of iodine in solution; the type of liquid suspending medium; the temperature of the system (which affects the solubility of iodine in the suspending medium); and the type of protective material, if any, added to the suspending medium to reduce agglomeration of the particles. For example, an excessive amount of chloroform will precipitate nitrocellulose out of solution, causing the particles to group together or agglomerate. At ordinary room temperatures, using nitrocellulose as the protective material, up to about 50% by weight of chloroform can be added to a herapathite-isopentyl acetate suspension, based on the total weight of the liquid suspending medium. At higher temperatures, the amount of chloroform that can be added decreases significantly. For example, only 20% or less chloroform by weight can be tolerated near the boiling point of chloroform, 61.2° C. If more chloroform is added, the suspension can turn into a gel.

The halogenated aliphatic hydrocarbon added should be a non-solvent for the suspended particles, and should be one that is miscible with any other solvent used in this suspension. Also, preferably but not necessarily, the halogen-including substance being added should be of relatively low molecular weight, such as chloroform. It should also preferably be a solvent for any protective material which is used to coat the particles.

In addition to chloroform (B.P. 61.2° C.), other halogenated aliphatic hydrocarbons that can be used are carbon tetrachloride (B.P. 76.7° C.), dibromotetrafluorethane (47.3° C.), sym-tetrachlorodifluoroethane (B.P. 92.8° C.), and polychlorotrifluoroethylene, the latter being a polymeric oil having the general formula $(CF_2CFCl)_n$ (B.P. 220°-225° C.).

The relationship of the number of halogens in the halogenated aliphatic hydrocarbon to all of the other atoms is a critical criterion to the effective functioning of this invention. When this ratio is less than 1:1, the benefits of the invention are not observable.

The halogenated aliphatic hydrocarbons discussed above have relatively high boiling points, which are advantageous because this indicates that these compounds have relatively low vapor pressures at the temperatures at which liquid suspension light valves are operated. High vapor pressures would tend to impair the valves by rupturing the liquid seals, or generating leaks, or bowing the faces of the valves, or otherwise deteriorating the valves.

The halogenated aliphatic hydrocarbon may have more than one type of halogen in its molecular structure, and may either be solid or fluid at room temperature before being added to the liquid suspension.

Care must be taken in choosing the halogenated aliphatic hydrocarbon, protective substance, and liquid suspending medium, particularly when used at relatively high temperatures, not to exceed the solubility of the protective substance in the suspending medium nor to substantially adversely affect the balance of attraction between the protective substance and the suspended particles. The suspending medium may be a mixed solvent including the halogenated aliphatic hydrocarbon, or the suspending medium can be entirely composed of the halogenated aliphatic compound.

Light polarizing particles can also be formed from quinine bisulfate, iodine and any of the various iodides other than hydriodic acid. When hydriodic acid is used, herapathite is formed. When other iodides are used such as potassium iodide, ammonium iodide, rubidium iodide or cesium iodide for example, other kinds of light polarizing particles are formed to which the invention herein is applicable.

The present invention is illustrated by the following Examples:

EXAMPLE 1

A suspension of herapathite in isopentyl acetate was placed in a 2" square inactivated light valve. The color of the suspension was purple and its optical density for white light was 3.0 (corresponding to a transmission of 0.1%). When the light valve was activated by applying a voltage gradient of about 30 volts/mil AC across the suspension, its optical density decreased to 0.8. The light valve was deactivated and its optical density returned to 3.0. Upon addition of 15% chloroform by weight, the optical density increased to 3.2. The light valve was again activated and the open optical density was nearly 0.8 as it was before adding chloroform. The light valve was deactivated. Then enough isopentyl acetate was added to the suspension to dilute it back to a closed optical density of 3.0. Upon activation by the same voltage as previously used, the open optical density decreased to 0.7. Thus, the density ratio of the suspension (i.e., the closed optical density divided by the open optical density) was increased from 3.0/0.8 or 3.75 to 3.0/0.7 or 4.3 by the addition of the chloroform, and the efficiency of the light valve improved. The increase in optical density of the suspension was caused by the increase in polarizing effectiveness of the particles. The polarizing effectiveness is increased because the particles with the application of the present invention, extinguish each other in the inactivated condition more than before the application of the invention.

EXAMPLE 2

Example 1 was repeated except that carbon tetrachloride is substituted for chloroform with substantially the same results.

EXAMPLE 3

Example 1 was repeated except that dibromotetrafluoroethane is substituted for chloroform with substantially the same results.

EXAMPLE 4

Example 1 was repeated except that polychlorotrifluoroethane was substituted for chloroform and it was necessary to use in excess of 20% of the added compound by weight to get substantially the same change in color and optical density of the suspension as in Example 1.

EXAMPLE 6

A suspension of herapathite in a suspending medium comprising 80% by weight diisodecyladipate and 20% chloroform was placed in a sealed test tube in an oven at 165° F. for one week. At the end of that period the suspension had substantially the identical color, closed optical density and density ratio as it had prior to the test.

EXAMPLE 7

Example 1 is repeated except that quinine bisulfate potassium iodide periodide is substituted for herapathite with substantially the same results.

EXAMPLE 8

Example 1 is repeated except that quinine bisulfate ammonium iodide periodide is substituted for herapathite with substantially the same results.

EXAMPLE 9

Example 1 is repeated except that quinine bisulfate rubidium iodide periodide is substituted for herapathite with substantially the same results.

EXAMPLE 10

Example 1 is repeated except that quinine bisulfate cesium iodide periodide is substituted for herapathite with substantially the same results.

EXAMPLE 11

A suspension of cupric bromide, prepared by mortar grinding cupric bromide in isopentyl acetate, was place in the same light valve as Example 1. The suspension had a green appearance and a closed optical density of 2.2 in white light. A small drop of bromine, about 0.01 gm. was added to the suspension making it appear visually as a lighter shade of green. The closed optical density decreased to 1.98. Upon addition of less than 4% chloroform by weight, the suspension turned a dark orange, and its closed optical density in white light increased substantially to 2.85. Detailed analysis at wavelengths between 400 and 700 millimicrons showed that addition of chloroform increased the closed optical density at all wavelengths but particularly in the center of the visible spectrum. At 400 millimicrons, the density increased from about 2.4 to 3.9; at 500 millimicrons from about 1.9 to 3.1; and at 600 millimicrons it increased from about 1.7 to 2.7.

In an alternative embodiment of this invention, all or nearly all of the suspending medium is comprised of the halogenated aliphatic hydrocarbon, such as chloroform. Generally, the halogenated hydrocarbon will comprise from 1 to 50%, preferably 4–50%, by weight of the total weight liquid suspending medium.

I claim:

1. A light valve which comprises a cell, a liquid suspension of small particles selected from the group consisting of halogenated alkaloid acid salts and metal halides in a liquid suspending medium in said cell, a polymeric stabilizer dissolved in said liquid suspending medium to prevent agglomeration of said particles, and means for applying an electric field through said suspension, said liquid suspending medium comprising a liquid, saturated, aliphatic halogenated hydrocarbon having a ratio of halogen atoms to all other atoms therein of greater than 1:1, the halogen atoms of said particles being iodine and/or bromine and the halogen atoms of said halogented hydrocarbon being of lower atomic weight than the halogen atoms of said particles, and at least 50% the halogen atoms of said halogenated hydrocarbon being selected from the group consisting of fluorine and chlorine.

2. The light valve according to claim 1, wherein at least 60% of all the atoms of the halogenated aliphatic hydrocarbon are halogen atoms.

3. The light valve according to claim 1, wherein said halogenated aliphatic hydrocarbon has at least two halogen atoms for each non-halogen atom.

4. The light valve according to claim 1, wherein said halogenated aliphatic hydrocarbon is selected from the group consisting of chloroform, carbon tetrachloride, dibromotetrafluoroethane, sym-tetrachlorodifluoroethane and polychlorotrifluoroethylene.

5. The light valve according to claim 1, wherein said halogenated alkaloid acid salt is light polarizing.

6. The light valve according to claim 5, wherein said alkaloid is selected from the group consisting of pyridine, picoline, diphenyl oxazole, quinoline, quinaldine, and toluidine.

7. The light valve according to claim 5, wherein said alkaloid is a heterocyclic organic nitrogen base.

8. The light valve according to claim 7, wherein said alkaloid is a quinine alkaloid.

9. The light valve according to claim 8, wherein said quinine alkaloid is selected from the group consisting of quinine, cinchonidine, hydrocinchonidine, and hydrocinchonine.

10. The light valve according to claim 5, wherein said halogenated alkaloid acid salt is quinine bisulfate ammonium iodide periodide, quinine bisulfate rubidium iodide periodide, or quinine bisulfate cesium iodide periodide.

11. The light valve according to claim 1, wherein the amount of said halogenated aliphatic hydrocarbon is 1 to 50 percent by weight of said liquid suspending medium, based on the total weight of the liquid suspending medium.

12. The light valve according to claim 11, wherein the amount of said halogenated aliphatic hydrocarbon is 4 to 50 percent by weight.

13. The light valve according to claim 1, wherein the liquid suspending medium consists essentially of said halogenated aliphatic hydrocarbon.

* * * * *